(12) United States Patent
Shenbagam et al.

(10) Patent No.: US 11,658,899 B2
(45) Date of Patent: May 23, 2023

(54) ROUTING CONFIGURATION FOR DATA CENTER FABRIC MAINTENANCE

(71) Applicant: VMware, Inc., Palo Alto, CA (US)

(72) Inventors: Jayaramakrishnan Shenbagam, Sunnyvale, CA (US); Bhushan Kanekar, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 8 days.

(21) Appl. No.: 17/155,090

(22) Filed: Jan. 22, 2021

(65) Prior Publication Data
US 2022/0239586 A1   Jul. 28, 2022

(51) Int. Cl.
*H04L 45/00* (2022.01)
*H04L 45/24* (2022.01)
*H04L 41/08* (2022.01)
*H04L 41/0823* (2022.01)
*H04L 41/0816* (2022.01)
*H04L 45/02* (2022.01)

(52) U.S. Cl.
CPC .......... *H04L 45/22* (2013.01); *H04L 41/0816* (2013.01); *H04L 41/0836* (2013.01); *H04L 41/0886* (2013.01); *H04L 45/02* (2013.01); *H04L 45/24* (2013.01)

(58) Field of Classification Search
CPC ............. H04L 41/0816; H04L 41/0836; H04L 41/0886; H04L 45/02; H04L 45/22; H04L 45/24; H04L 41/082; H04L 41/5025
See application file for complete search history.

(56) References Cited

U.S. PATENT DOCUMENTS

| | | | | |
|---|---|---|---|---|
| 8,750,288 B2 * | 6/2014 | Nakil | .............. | H04L 45/38 709/224 |
| 8,755,377 B2 * | 6/2014 | Nakil | .............. | H04L 49/254 370/360 |
| 8,953,441 B2 * | 2/2015 | Nakil | .............. | H04L 49/70 370/228 |
| 8,959,185 B2 * | 2/2015 | Nakil | .............. | H04L 41/0659 709/219 |
| 9,094,308 B2 * | 7/2015 | Ghose | .............. | H04L 49/356 |

(Continued)

OTHER PUBLICATIONS

Justin Meza et al. "A Large Scale Study of Data Center Network Reliability", IMC'18, Oct. 31-Nov. 2, 2018, Boston, MA, USA, 15 pages. (Year: 2018).*

*Primary Examiner* — George C Neurauter, Jr.
(74) *Attorney, Agent, or Firm* — Su IP Consulting (57) ABSTRACT

Example methods and systems for routing configuration for data center fabric maintenance are described. One example may comprise a management entity monitoring state information associated with multiple links connecting multiple network elements. The multiple links may include a first link connecting a first network element and a second network element. In response to determination that maintenance is required for the first link based on the state information, a maintenance mode may be activated for the first link. A first routing configuration may be performed to influence the first network element and the second network element to steer traffic away from the first link to second link(s). In response to deactivation of the maintenance mode for the first link, a second routing configuration may be performed to influence the first network element and the second network element to restore traffic on the first link.

21 Claims, 9 Drawing Sheets

(56) References Cited

U.S. PATENT DOCUMENTS

| | | | | |
|---|---|---|---|---|
| 9,374,270 | B2* | 6/2016 | Nakil | H04L 41/0659 |
| 9,553,788 | B1* | 1/2017 | Callan | H04L 43/0811 |
| 9,710,762 | B2* | 7/2017 | Nakil | G06N 20/00 |
| 10,129,184 | B1* | 11/2018 | Achola | H04L 49/251 |
| 10,666,554 | B2* | 5/2020 | Muthukaruppan | H04L 45/28 |
| 10,742,501 | B1* | 8/2020 | Pianigiani | H04L 41/082 |
| 10,785,549 | B2* | 9/2020 | Adiletta | G08C 17/02 |
| 10,938,660 | B1* | 3/2021 | Kapur | H04L 41/0659 |
| 11,095,510 | B2* | 8/2021 | Kaliyamoorthy | H04L 47/41 |
| 11,201,782 | B1* | 12/2021 | Pianigiani | H04L 45/64 |
| 2011/0307541 | A1* | 12/2011 | Walsh | H04L 67/1034 |
| | | | | 709/227 |
| 2015/0244617 | A1* | 8/2015 | Nakil | G06F 11/07 |
| | | | | 709/224 |
| 2016/0313985 | A1* | 10/2016 | Sprygada | G06F 8/654 |
| 2018/0025299 | A1* | 1/2018 | Kumar | G02B 6/3897 |
| | | | | 709/224 |
| 2018/0173557 | A1* | 6/2018 | Nakil | H04L 43/0852 |
| 2019/0173805 | A1* | 6/2019 | Balan | H04L 45/04 |
| 2020/0358648 | A1* | 11/2020 | Somala | H04L 41/044 |

* cited by examiner

*IP routing entry at LEAF1 (before activating maintenance mode)*

```
>LEAF1# show ip route 10.2.1.0/24                                       610
  Routing entry for 10.2.1.0/24
  Known via bgp, type external
  Distance 20, Metric 0
  Last update 00:23:41
  Routing descriptors Blocks:
      via 192.168.1.2       --' path via SPINE1
      via 192.168.1.10      -' path via SPINE2              } 620
```

*BGP routing entry at LEAF1 (before activating maintenance mode)*

```
>LEAF1# show ip bgp 10.2.1.0/24                                         630
  BGP routing table entry for 10.2.1.0/24
  Paths: (2 available, table Default-IP-Routing-Table.)
  Received from :
    192.168.1.2(1.1.1.1) Best Multipath
    AS_PATH : 65500 64603
    Next-Hop : 192.168.1.2, Cost : 0                        } 640
    Origin INCOMPLETE, Metric 0, LocalPref 100, Weight 0,
    Route-reflector origin : 0.0.0.0
  Received from :
    192.168.1.10(1.1.1.2) Multipath
    AS_PATH : 65501 64603
    Next-Hop : 192.168.1.10, Cost : 0                       } 650
    Origin INCOMPLETE, Metric 0, LocalPref 100, Weight 0,
    Route-reflector origin : 0.0.0.0
```

Fig. 6

```
>SPINE2# show running-configuration bgp                           730
    router bgp 65501
    bestpath as-path multipath-relax
    bestpath router-id ignore
    maximum-paths ebgp 2
    router-id 1.1.1.2
    !
    neighbor 192.168.1.11 -------' From SPINE2 - LEAF1 neighbor
    bfd
    local-as  65501
    remote-as 64601
    no shutdown
    !
    address-family ipv4 unicast
    route-map AS-PRE out ----                       740
    route-map AS-PRE permit 10                   Modify attribute
    set as-path prepend 65501 65501 65501          information
```

*BGP routing entry at LEAF1 (after activating maintenance mode)*

```
>LEAF1# show ip bgp 10.2.1.0/24                                   750
    BGP routing table entry for 10.2.1.0/24
    Paths: (2 available, table Default-IP-Routing-Table.)
    Received from :
        192.168.1.2(1.1.1.1) Best
        AS_PATH : 65500 64603
 760    Next-Hop : 192.168.1.2, Cost : 0
        Origin INCOMPLETE, Metric 0, LocalPref 100, Weight  0,
        Route-reflector origin : 0.0.0.0
    Received from :
        192.168.1.10(1.1.1.2)
        AS_PATH : 65501 65501 65501 65501 64603 ------ higher path
 770    Next-Hop : 192.168.1.10, Cost : 0
        Origin INCOMPLETE, Metric 0, LocalPref 100, Weight  0,
        Route-reflector origin : 0.0.0.0
```

Fig. 7

*Updated IP routing entry at LEAF1 (after activating maintenance mode)*

```
>LEAF1# show ip route 10.2.1.0/24                            810
    Routing entry for 10.2.1.0/24
    Known via bgp, type external
    Distance 20, Metric 0
    Last update 00:51:38
    Routing descriptors Blocks:
        via 192.168.1.2         --' path via SPINE1
```

*IP routing entry at SPINE2 (before activating maintenance mode)*

```
>SPINE2# show ip route 10.1.1.0/24                           820
    Routing entry for 10.1.1.0/24
    Known via bgp, type external
    Distance 20, Metric 0
    Last update 01:09:28
    Routing descriptors Blocks:
        via 192.168.1.11        --' path via LEAF1
        via 192.168.1.13        -'  path via LEAF2
```

*Updated IP routing entry at SPINE2 (after activating maintenance mode)*

```
>SPINE2# show ip route 10.1.1.0/24                           830
    Routing entry for 10.1.1.0/24
    Known via bgp, type external
    Distance 20, Metric 0
    Last update 00:00:12
    Routing descriptors Blocks:
        via 192.168.1.13        --' path via LEAF2
```

ROUTING CONFIGURATION FOR DATA CENTER FABRIC MAINTENANCE

BACKGROUND

Virtualization allows the abstraction and pooling of hardware resources to support virtualization computing instance such as virtual machines (VMs) in a software-defined data center (SDDC). For example, through compute virtualization (also known as hardware virtualization), VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, hosts may be connected via a data center fabric that includes multiple links connecting various network elements (e.g., switches, routers, etc.). The data center fabric is susceptible to various issues, in which case maintenance would be required.

DETAILED DESCRIPTION

According to examples of the present disclosure, data center fabric maintenance may be performed more efficiently to reduce network downtime and likelihood of routing configuration errors. In one example, a management entity (e.g., fabric manager 160) may monitor state information associated with multiple links connecting multiple network elements. The multiple links may include a first link connecting a first network element (e.g., leaf switch 181 in FIG. 1) and a second network element (e.g., spine switch 192 in FIG. 1). In response to determination that maintenance is required for the first link based on the state information, the management entity may activate a maintenance mode for the first link. A first routing configuration may be performed to influence the first network element and the second network element to steer traffic away from the first link to at least one second link while the maintenance mode is activated.

In response to deactivation of the maintenance mode for the first link, the management entity may perform a second routing configuration to influence the first network element and the second network element to restore traffic on the first link. Examples of the present disclosure should be contrasted against conventional approaches that necessitate users (e.g., network administrators) to perform various manual changes. As will be described further below, examples of the present disclosure may be implemented to improve the efficiency of routing configuration for traffic steering and restoration. This way, the likelihood of human errors during the maintenance process may be reduced.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Figure 1:
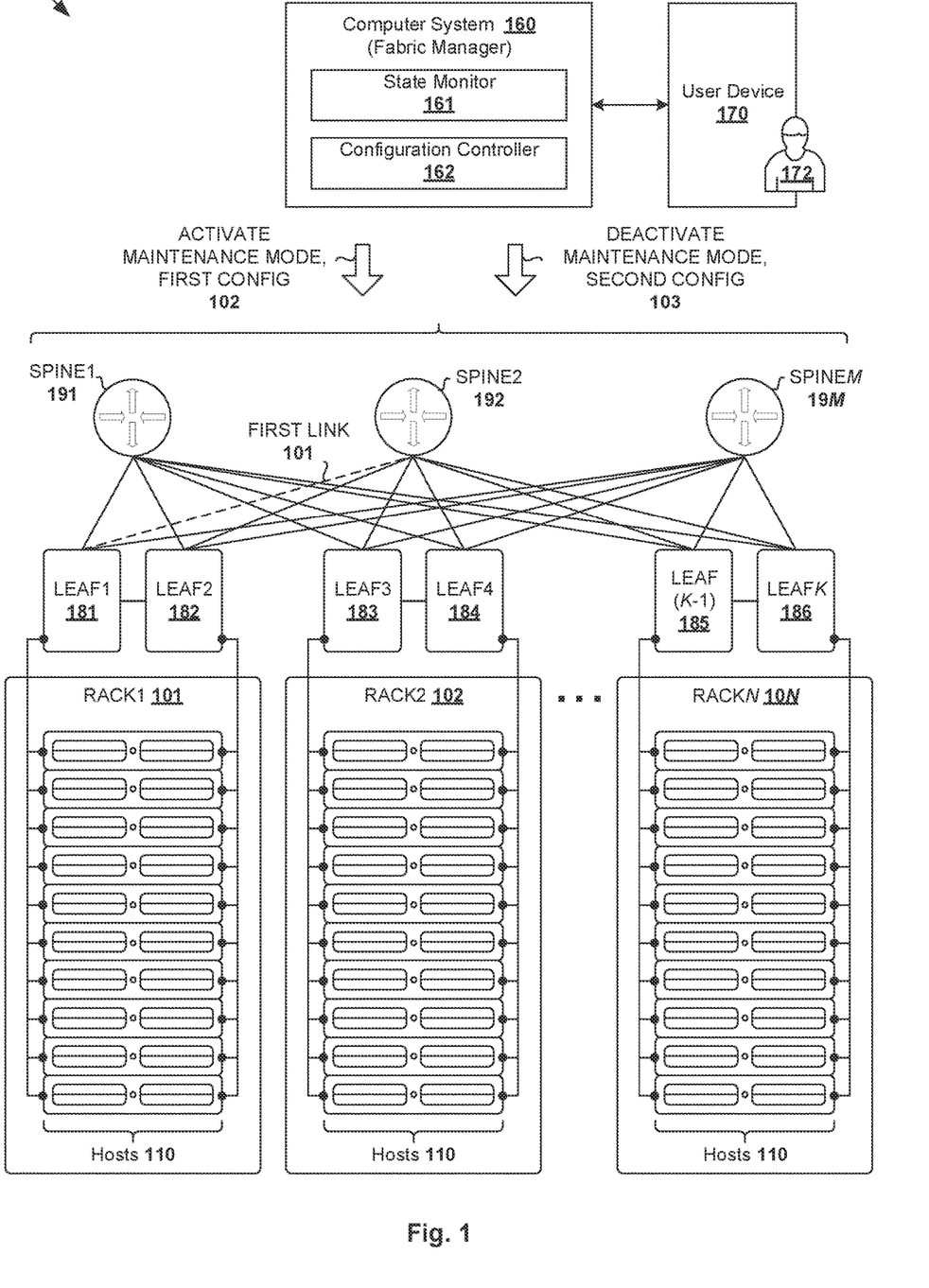
FIG. 1 is a schematic diagram illustrating an example network environment in which routing configuration for data center fabric maintenance may be performed.

FIG. 1 is a schematic diagram illustrating example network environment 100 in which routing configuration for data center fabric maintenance may be performed. It should be understood that, depending on the desired implementation, network environment 100 may include additional and/or alternative components than that shown in FIG. 1. Example network environment 100 includes a data center fabric that is designed with a spine-leaf architecture. Here, the data center fabric may include a leaf layer with multiple leaf switches 181-186 and a spine layer with multiple (M) spine switches 191-19M. A leaf switch is also referred to as a top-of-rack (ToR) switch because it provides network access to hosts 110 located at a particular rack. A spine switch in the spine layer extends the physical network fabric of ToR switches 181-186 to provide connectivity among racks 101-10N.

Using a full-mesh topology, each of leaf switches 181-186 may be connected to each of spine switches 191-19M. This way, all east-west traffic from one rack to another is equidistant with a deterministic number of hops. All ports on a spine switch may connect to leaf switches 181-186 using layer-2 switching and/or layer-3 routing technologies. Using N to denote the number of racks, any suitable number of leaf switches may be located at the top of each compute rack. For example, a first pair of leaf switches "LEAF1" and "LEAF2" (see 181-182) may provide network access to hosts 110 on first rack 101, a second pair of leaf switches "LEAF3" and "LEAF4" (see 183-184) for second rack 102, and so on (see 185-186). For redundancy, each host 110 may be connected to multiple leaf switches at the top of a rack.

In practice, network environment 100 may include any number of hosts (also known as a "host computers", "host devices", "physical servers", "server systems", "transport nodes," etc.), where each host may be supporting tens or hundreds of virtual machines (VMs). Hosts 110 will be explained further using FIG. 2, which is a schematic diagram illustrating example physical implementation view 200 of hosts 110 in network environment 100 in FIG. 1. It should be understood that example 200 may include additional and/or alternative components than that shown in FIG. 2.

Figure 2:
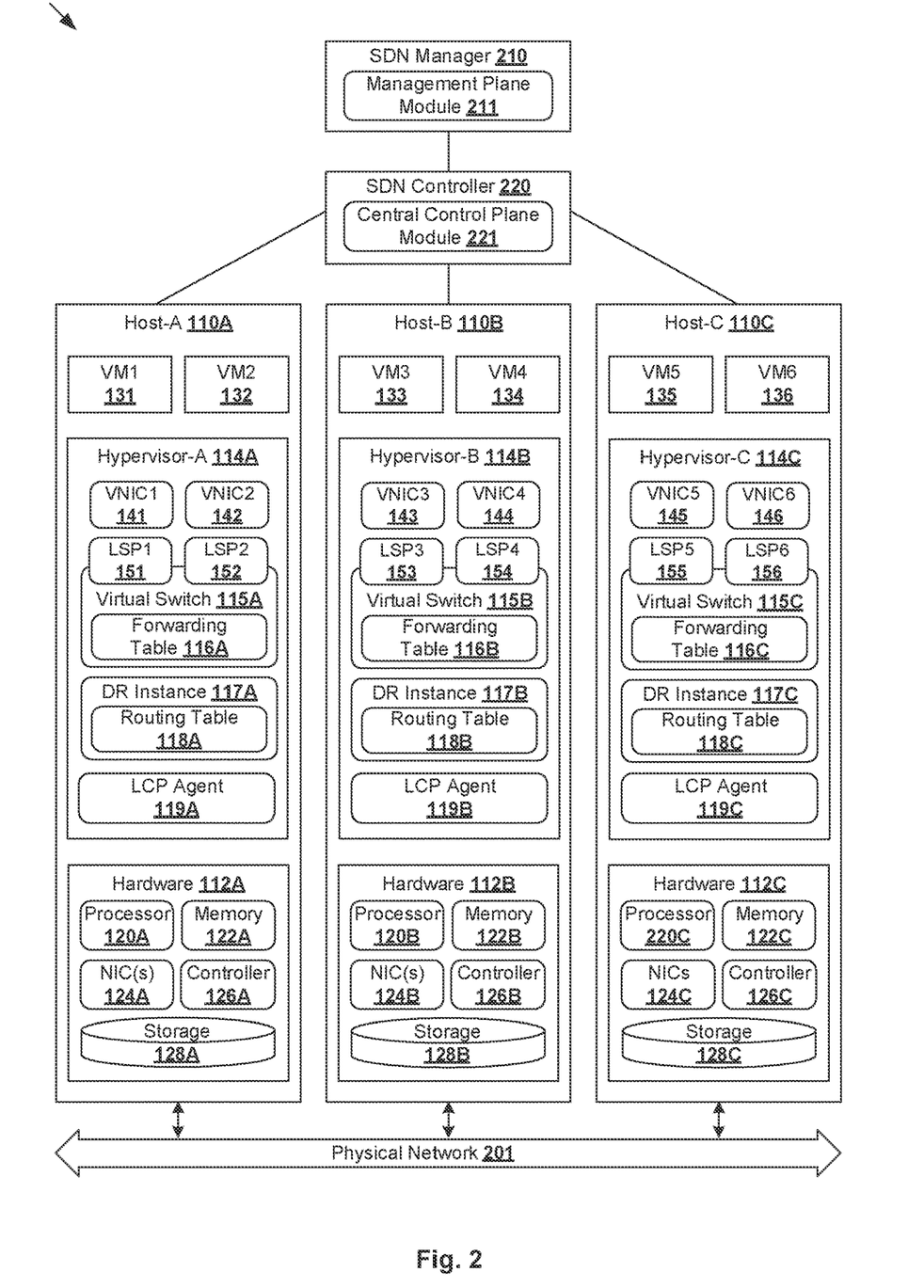
FIG. 2 is a schematic diagram illustrating an example physical implementation view of hosts in the network environment in FIG. 1.

Referring now to FIG. 2, several hosts 110 are shown in detail, such as hosts 110A-C that may be located on the same physical rack, or different racks in FIG. 1. Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VMs 131-132; host-B 110B supports VMs 133-134; and host-C 110C supports VMs 135-136. Physical network 201 may be supported by leaf switches 181-186 and spine switches 191-19M in FIG. 1. Hypervisor 114A/114B/114C maintains a mapping between underlying hardware 112A/112B/112C and virtual resources allocated to respective VMs 131-136. The virtual resources may be used by each VM to support a guest operating system (OS) and application(s).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-4" to a network or Internet Protocol (IP) layer; and "layer-4" to a transport layer (e.g., using Transmission Control Protocol (TCP) and User Datagram Protocol (UDP), etc.), in the Open System Interconnection (OSI) model, although the concepts described herein may be used with other networking models.

Through compute virtualization, virtual resources may be allocated each VM, such as virtual guest physical memory, virtual disk, virtual network interface controller (VNIC), etc. In the example in FIG. 2, hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc. Hardware resources may be emulated using virtual machine monitors (VMMs). For example, VNICs 141-146 are emulated by corresponding VMMs (not shown for simplicity).

Through network virtualization, logical overlay networks may be provisioned, changed, stored, deleted and restored programmatically without having to reconfigure the underlying physical hardware architecture in data center(s). Logical switches and logical routers may be implemented in a distributed manner and can span multiple hosts to connect VMs 131-136 in FIG. 1. For example, hypervisor 114A/114B/114C implements virtual switch 115A/115B/115C and logical distributed router (DR) instance 117A/117B/117C to handle egress packets from, and ingress packets to, corresponding VMs 131-136.

In practice, logical switches may be implemented to provide logical layer-2 connectivity. A particular logical switch may be collectively by multiple virtual switches (e.g., 115A-C) and represented internally using forwarding tables (e.g., 116A-C) at respective virtual switches. Forwarding tables 116A-C may each include entries that collectively implement the respective logical switches. A particular logical DR may be implemented collectively by multiple DR instances (e.g., 117A-C) and represented internally using routing tables (e.g., 118A-C) at respective DR instances. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches, whereas a "virtual switch" may refer generally to a software switch or software implementation of a physical switch. In practice, there is usually a one-to-one mapping between a logical port on a logical switch and a virtual port on a virtual switch. A logical overlay network (also known as "logical network") may be formed using any suitable tunneling protocol, such as Virtual eXtensible Local Area Network (VXLAN), Generic Network Virtualization Encapsulation (Geneve), etc.

SDN manager 210 and SDN controller 220 are example network management entities that facilitate management of hosts 110A-C and VMs 131-136 in network environment 100. An example SDN controller is the NSX controller component of VMware NSX® (available from VMware, Inc.) that resides on a central control plane (CCP), and connected to SDN manager 210 (e.g., NSX manager) on a management plane (MP). See also CCP module 221 and MP module 211. Each host 110A/110B/110C may implement local control plane (LCP) agent 119A/119B/119C to maintain control-plane connectivity with SDN controller 220. In practice, management entity 210/220 may be implemented using physical machine(s), virtual machine(s), a combination thereof, etc. Depending on the desired implementation, some servers in each physical rack may be configured to be part of a management domain.

Referring to FIG. 1 again, the spine-leaf architecture is generally reliable and efficient, but susceptible to various issues. Conventionally, if there is an error affecting a particular link (also known as an "interlink") of the data center fabric, a network engineer generally attempts to isolate that link manually. After the manual isolation, the network engineer would have to shut down the link and change a physical cable (if required). Once completed, the network engineer would then bring up the link again to allow traffic to be routed through the link. Such conventional approaches present a number of challenges. For example, since the entire maintenance process is manual, it may be inefficient, lack accuracy and prone to human errors. Also, not all network engineers have the expertise or permission to perform the necessary steps during the maintenance process.

Data Center Fabric Maintenance

According to examples of the present disclosure, data center fabric maintenance may be performed more efficiently to reduce network downtime and likelihood of routing configuration errors. Instead of necessitating manual changes by users (e.g., network administrators or engineers), examples of the present disclosure may be implemented to perform routing configuration when maintenance is required. This way, routing configuration may be performed automatically and more efficiently to steer traffic away from a link requiring maintenance and to restore traffic on the link after maintenance is performed.

In the following, various examples will be described using a computer system capable of acting as a management entity, such as fabric manager 160 in FIG. 1. Fabric manager 160 may be capable of configuring multiple links and multiple network elements forming a data center fabric. Fabric manager 160 may interact with user device 170 operated by user 172 (e.g., network administrator or engineer) via any suitable user interface, such as application programming interface (API), command line interface (CLI), graphical user interface (GUI), etc. Examples of the present disclosure may be performed by fabric manager 160 using any suitable software and/or hardware component(s), such as state monitor 161 to perform monitoring, configuration controller 162 to perform routing configuration(s), etc.

Figure 3:
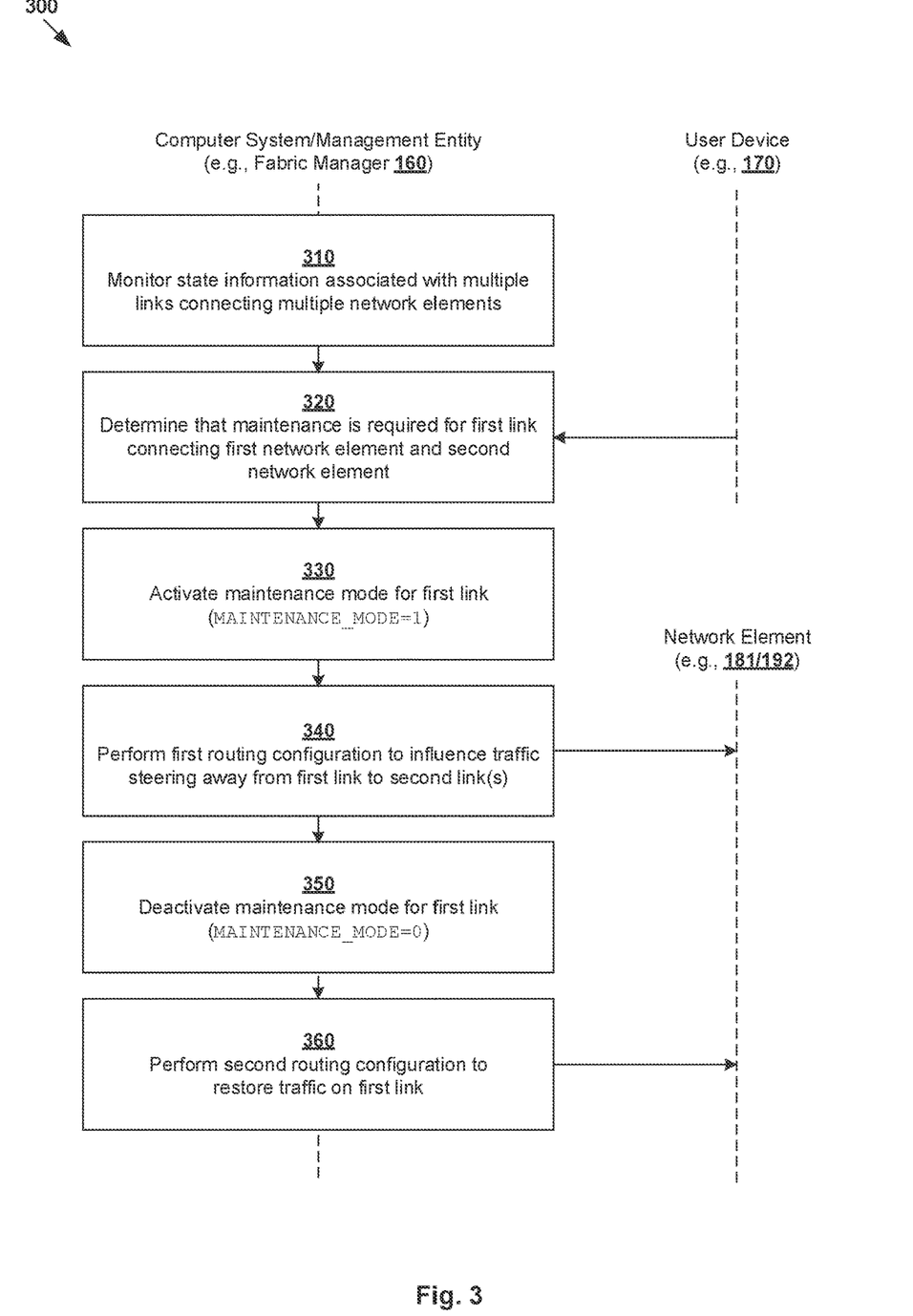
FIG. 3 is a flowchart of an example process for a management entity to perform routing configuration for data center fabric maintenance.

In more detail, FIG. 3 is a flowchart of example process 300 for a management entity to perform routing configuration for data center fabric maintenance. Example process 300 may include one or more operations, functions, or actions illustrated by one or more blocks, such as f 310 to 360. The various blocks may be combined into fewer blocks, divided into additional blocks, and/or eliminated depending on the desired implementation. FIG. 3 will be explained using the example in FIG. 1.

At 310 in FIG. 3, fabric manager 160 (e.g., fabric state monitor 161) may monitor state information associated with multiple links and multiple network elements forming a data center fabric. As used herein, the term "network element" may refer generally to any physical or virtual entity, such as leaf switch (e.g., any of 181-186), spine switch (e.g., any of 191-19M), router, gateway, etc. The term "link" (also known as an "interlink") may refer generally to a connection between two network elements. For example in FIG. 1, the multiple links may include a first link (see 101) connecting first network element=LEAF1 181 and second network element=SPINE2 192.

At 320, 330 and 340 in FIG. 3, in response to determination that maintenance is required for the first link based on the state information, fabric manager 160 (e.g., fabric configuration controller 162) may activate a maintenance mode for the first link and perform a first routing configuration. For example in FIG. 1, the first routing configuration may be performed to influence LEAF1 181 and SPINE2 192 to steer traffic away from the first link to at least one second link. Traffic steering may be performed while the maintenance mode is activated for the first link. See also 102 in FIG. 1.

At 350 and 360 in FIG. 3, in response to a deactivation of the maintenance mode for the first link, fabric manager 160 may perform a second routing configuration to influence LEAF1 181 and SPINE1 191 to restore traffic on the first link after maintenance is completed or no longer required. Here, the term "restore" may refer generally to reinstating traffic forwarding via the first link after maintenance is completed or no longer required. After restoration, the level of traffic on the first link may be substantially higher, lower or the same as prior to maintenance. See also 103 in FIG. 1.

As will be described further using FIGS. 4-8, the first routing configuration at block 340 may include updating attribute information associated with SPINE2 192 influence LEAF1 181 to select a particular second link over the first link. For example using border gateway protocol (BGP), the "attribute information" may be an autonomous system (AS) attribute associated with SPINE2 192. The AS attribute may be updated to increase a length of a first AS path list associated with the first link (i.e., AS path prepending). To steer outgoing traffic from LEAF1 181, a routing table entry may be configured to influence LEAF1 181 to select of a particular second link (e.g., alternative link via SPINE1 191) over the first link. In this case, the updated routing table entry may specify the first AS path list associated with the first link that is longer than a second AS path list associated with the particular second link (see FIGS. 5-8).

To steer incoming traffic towards LEAF1 181, the first routing configuration may further include configuring SPINE2 192 to update a routing table entry to select a particular second link (e.g., alternative link via LEAF2 182) over the first link. To restore the traffic, the second routing configuration at block 360 may include updating the attribute information associated with SPINE2 192, such as by removing AS path prepending (to be discussed using FIG. 9). Although described using "AS attribute," it should be understood that any alternative or additional attribute information may be updated to achieve traffic steering and restoration to facilitate data center fabric maintenance, such as multi exit discriminator (MED) attribute, etc.

Example Data Center Fabric

Figure 4:
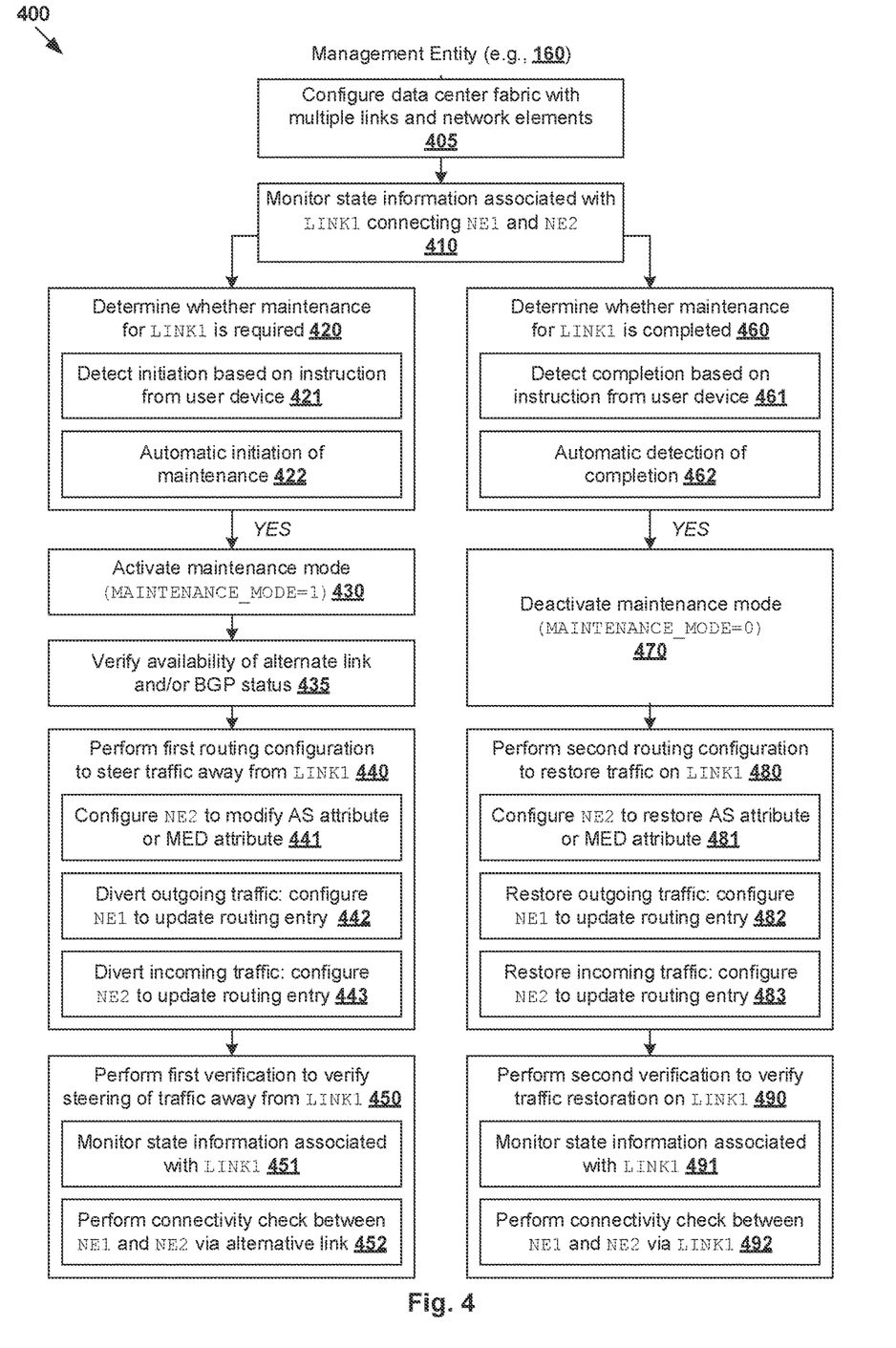
FIG. 4 is a flowchart of an example detailed process for a management entity to perform routing configuration for data center fabric maintenance.

FIG. 4 is a flowchart of example detailed process 400 for a computer system to perform routing configuration for data center fabric maintenance. Example process 400 may include one or more operations, functions, or actions illustrated by one or more blocks, such as 405 to 492. The various blocks may be combined into fewer blocks, divided into additional blocks, and/or eliminated depending on the desired implementation.

Figure 5:
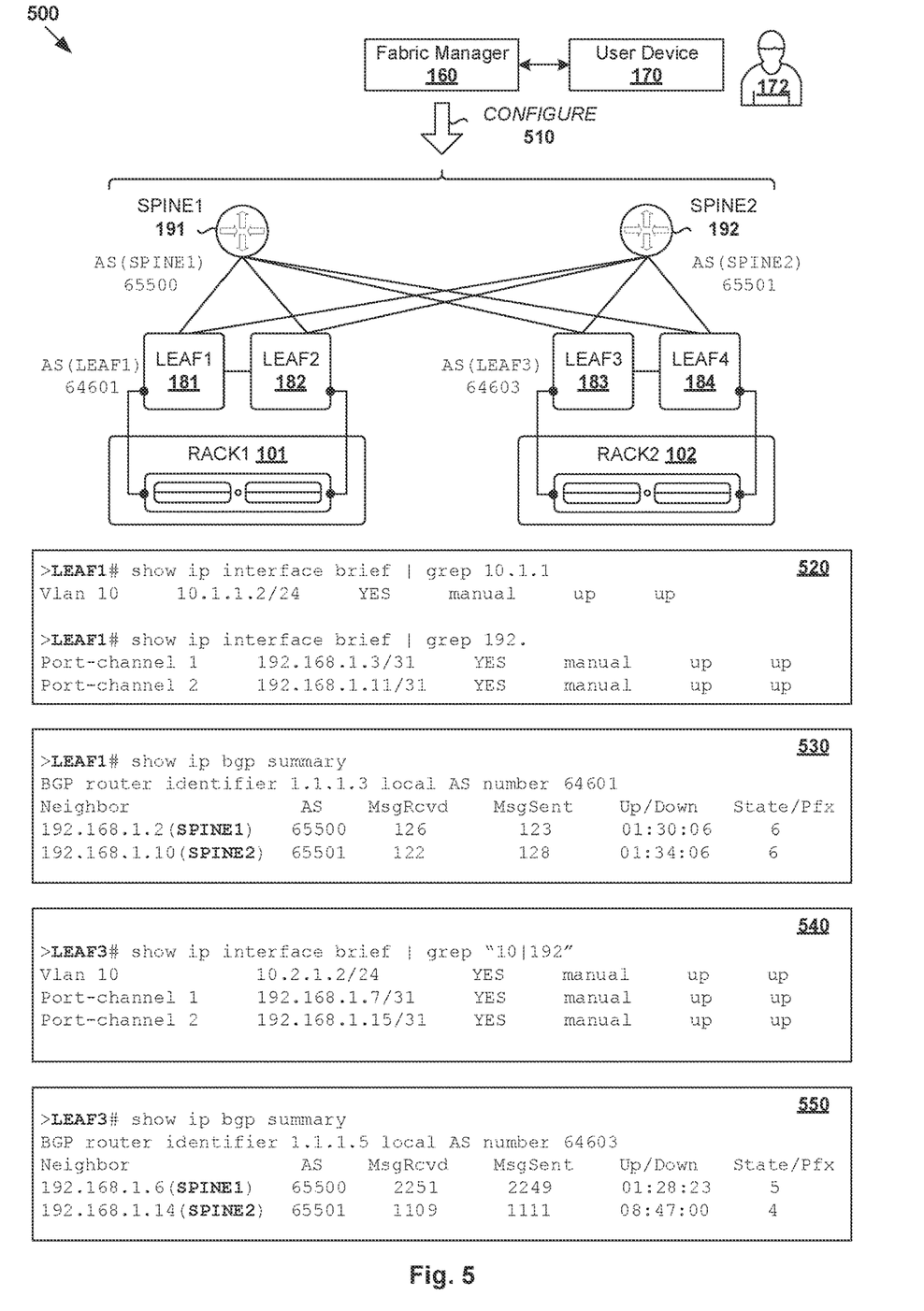
FIG. 5 is a schematic diagram illustrating a first example of routing configuration prior to activating a maintenance mode.
Figure 6:
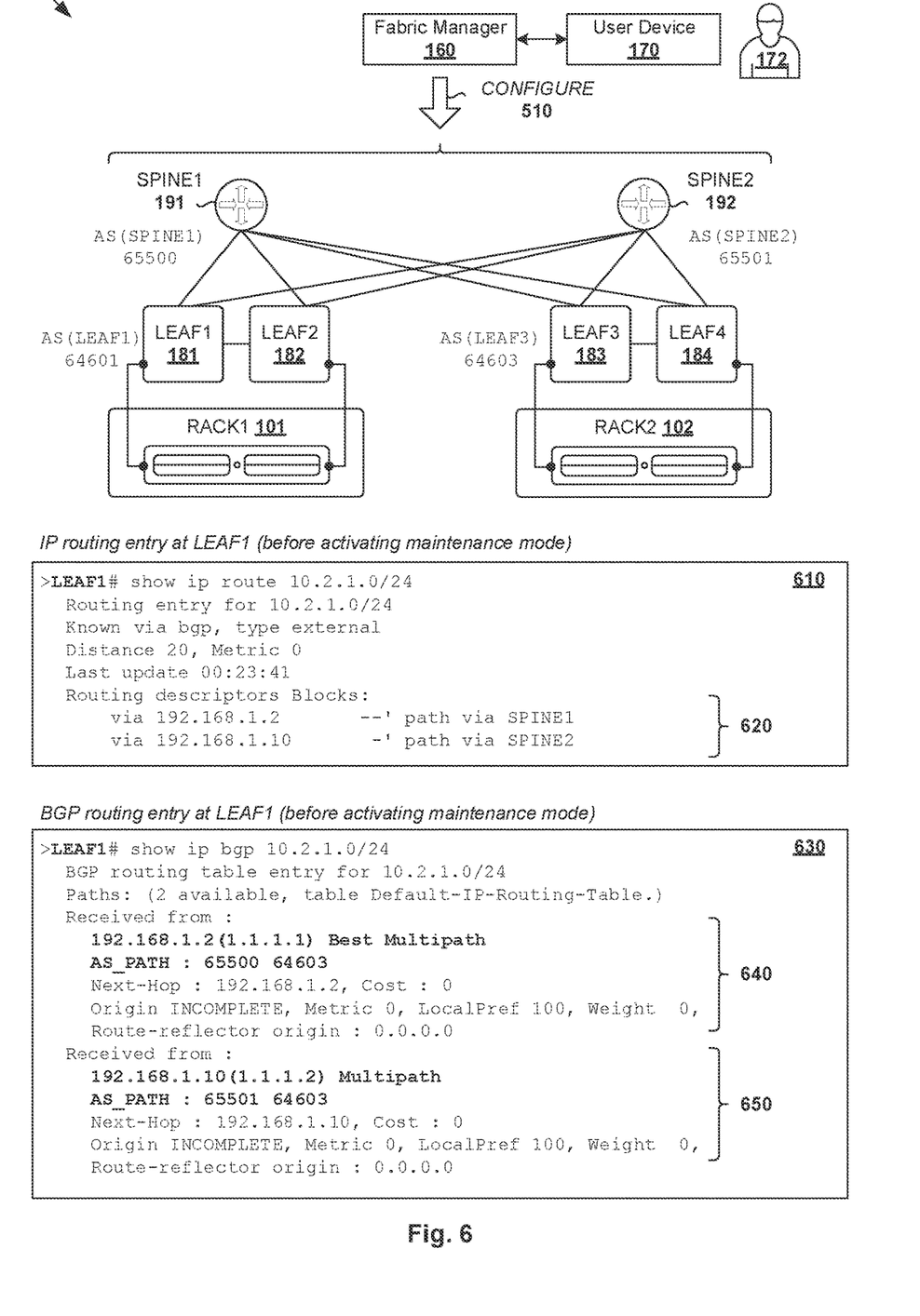
FIG. 6 is a schematic diagram illustrating a second example of routing configuration prior to activating a maintenance mode.

The example in FIG. 4 will be explained using FIGS. 5-6. FIG. 5 is a schematic diagram illustrating first example 500 of routing configuration prior to activating a maintenance mode. FIG. 6 is a schematic diagram illustrating second example 600 of routing configuration prior to activating a maintenance mode. Example process 400 may be performed by fabric manager 160 using state monitor 161, configuration controller 162, etc.

(a) Interfaces and BGP Neighbors

At 405 in FIGS. 4 and 510 in FIG. 5, fabric controller 160 may configure a data center fabric. In one example, the configuration may be based on instruction(s) received from user device 170 operated by user 172. Alternatively or additionally, the configuration may also be performed automatically, such as based on a script, template, etc. In the example in FIG. 5, the data center fabric includes multiple links and multiple network elements, such as spine switches (see SPINE1 and SPINE2 192-192), leaf switches (see LEAF1 to LEAF4 181-184) and links connecting these switches.

In a layer-3 spine-leaf architecture, for example, all links that are in production may be connected with layer-3 subnets. In this case, a dynamic protocol (e.g., BGP to be discussed below) may be enabled among switches 181-184, 191-192 to advertise the relevant local subnets. All server VLANs created on leaf switches 181-184 may be advertised using BGP. Using an equal cost multiple path (ECMP) algorithm, LEAF1 181 may distribute outgoing traffic equally between SPINE1 191 and SPINE2 192 (when all links are up and running).

At 520 in FIG. 5, configuration information associated with LEAF1 181 is shown, particularly IP information for various interfaces of LEAF 181. In one example, a VLAN interface is configured with VLAN ID="VLAN 10" and IP subnet=10.1.1.2/24. Further, LEAF1 181 may include two IP interfaces to connect with SPINE1 191 and SPINE2 192, respectively. A first port channel interface (see "Port-channel 1") connects LEAF1 181 with SPINE1 191, while a second port channel (see "Port-channel 2") with SPINE2 192. In other words, there are multiple links that connect LEAF1 181 with other leaf switches 182-184 for redundancy and fault tolerance.

In the example in FIG. 5, spine switches 191-192 and leaf switches 181-184 may be configured to exchange routing and network reachability information using any suitable protocol, such as BGP, etc. In general, BGP is a routing protocol for ASes to exchange information, including the AS path that traffic must transit to reach a particular destination network. This way, each AS may maintain a table of networks or "prefixes" that designate network reachability among multiple ASes, such as leaf switches 181-184 and spine switches 191-192. BGP runs over a reliable transport protocol (e.g., TCP), in which case a pair of BGP systems may establish a TCP connection prior to exchanging BGP messages.

At 530 in FIG. 5, LEAF1 181 may be configured to exchange routing information with multiple neighbors, such as spine switches 191-192. Here, LEAF1 181 may be configured with BGP router ID=1.1.1.3 and (local) AS number=64601. First neighbor=SPINE1 191 is configured with next hop=192.168.1.2 and (remote) AS number=65500. Second neighbor=SPINE2 192 is configured with next hop=192.168.1.10 and (remote) AS number=65501. In general, a BGP router ID is a 32-bit value that is represented using an IPv4 address. An AS number may be a 2-byte (e.g., 1 to 65535) or 4-byte number. BGP-related information may be stored in a BGP table maintained by LEAF1 181.

At 540 in FIG. 5, similar configurations may be performed for LEAF3 183. A VLAN interface may be configured with VLAN ID="VLAN 10" and IP subnet=10.2.1.2/24. A first port channel interface (see "Port-channel 1") connects LEAF3 183 with SPINE1 191, while a second port channel (see "Port-channel 2") with SPINE2 192. Similar to LEAF1 181, there are multiple links connecting LEAF3 183 with other leaf switches 181-182, 184 for redundancy and fault tolerance.

Further, at 550 in FIG. 5, LEAF3 183 may be configured to exchange routing information with multiple neighbors, including spine switches 191-192. Here, LEAF3 183 may be configured with BGP router ID=1.1.1.5 and local AS number=64603. First neighbor=SPINE1 191 is configured with next-hop IP address=192.168.1.6 and AS number=65500. Second neighbor=SPINE2 192 is configured with next-hop IP address=192.168.1.14 and AS number=65501.

(b) Network Reachability Information

Referring now to FIG. 6, at 610, an IP routing entry configured for LEAF1 181 is shown. The routing entry specifies network reachability information associated with destination network=10.2.1.0/24 in which LEAF3 183 is located. At 620, based on BGP messages from neighboring BGP systems 191-192, LEAF1 181 may learn two paths to reach the destination network. A first path is via SPINE1 191 configured with next-hop IP address=192.168.1.2. A second path is via SPINE2 192 configured with next-hop IP address=192.168.1.10 (see 530 in FIG. 5).

At 630 in FIG. 6, a BGP routing entry configured for LEAF1 181 is shown. The BGP routing entry may further specify AS path information associated with multiple paths to destination network=10.2.1.0/24 in which LEAF3 183 is located. At 640, a first path is associated with AS path list=(65500, 64603) associated with respective (SPINE1 191, LEAF3 183). The "AS path list" is an attribute specifying multiple ASes via which the destination network is reachable. The "AS path length" represents the number of ASes included in the list, which is length=2 for the first path because two ASes are traversed before reaching the destination network. The field "Best Multipath" indicates that the first path via SPINE1 191 is the best path.

At 650 in FIG. 6, a second path is associated with AS path list=(65501, 64603) associated with respective (SPINE2 192, LEAF3 183). Similar to the first path, the second path is associated with AS path length=2. Further, each BGP routing entry may specify any suitable path attribute information, such as origin codes (see "Origin"), inter-AS metric (see "Metric"), local preference value (see "LocalPref"), path weight (see "Weight"), etc. Note that similar configurations may be performed for other leaf switches 183-184 in FIGS. 5-6, the description of which is not included for brevity.

Activating Maintenance Mode and First Routing Configuration

Figure 7:
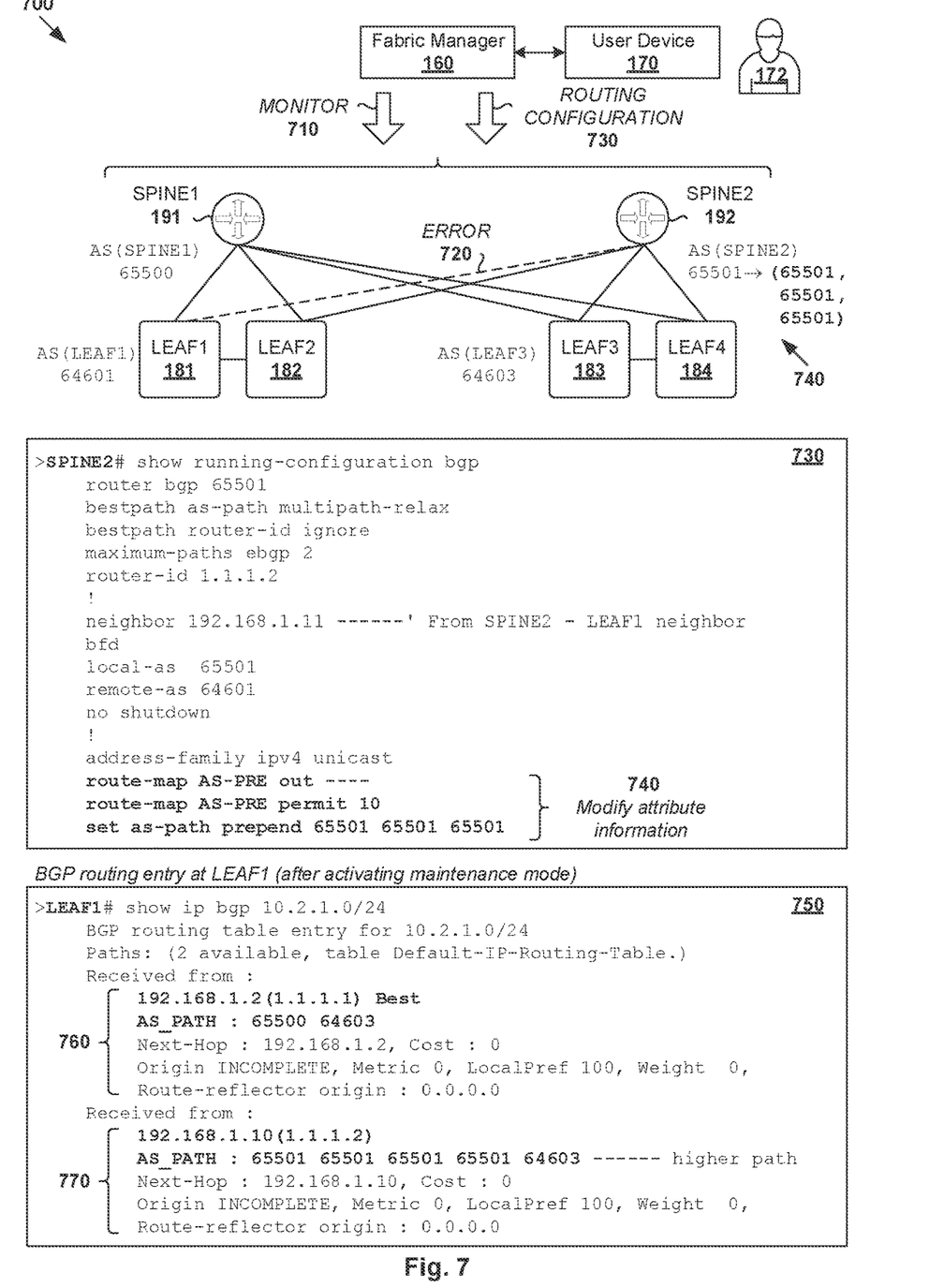
FIG. 7 is a schematic diagram illustrating a first example of routing configuration in response to activating a maintenance mode.
Figure 8:
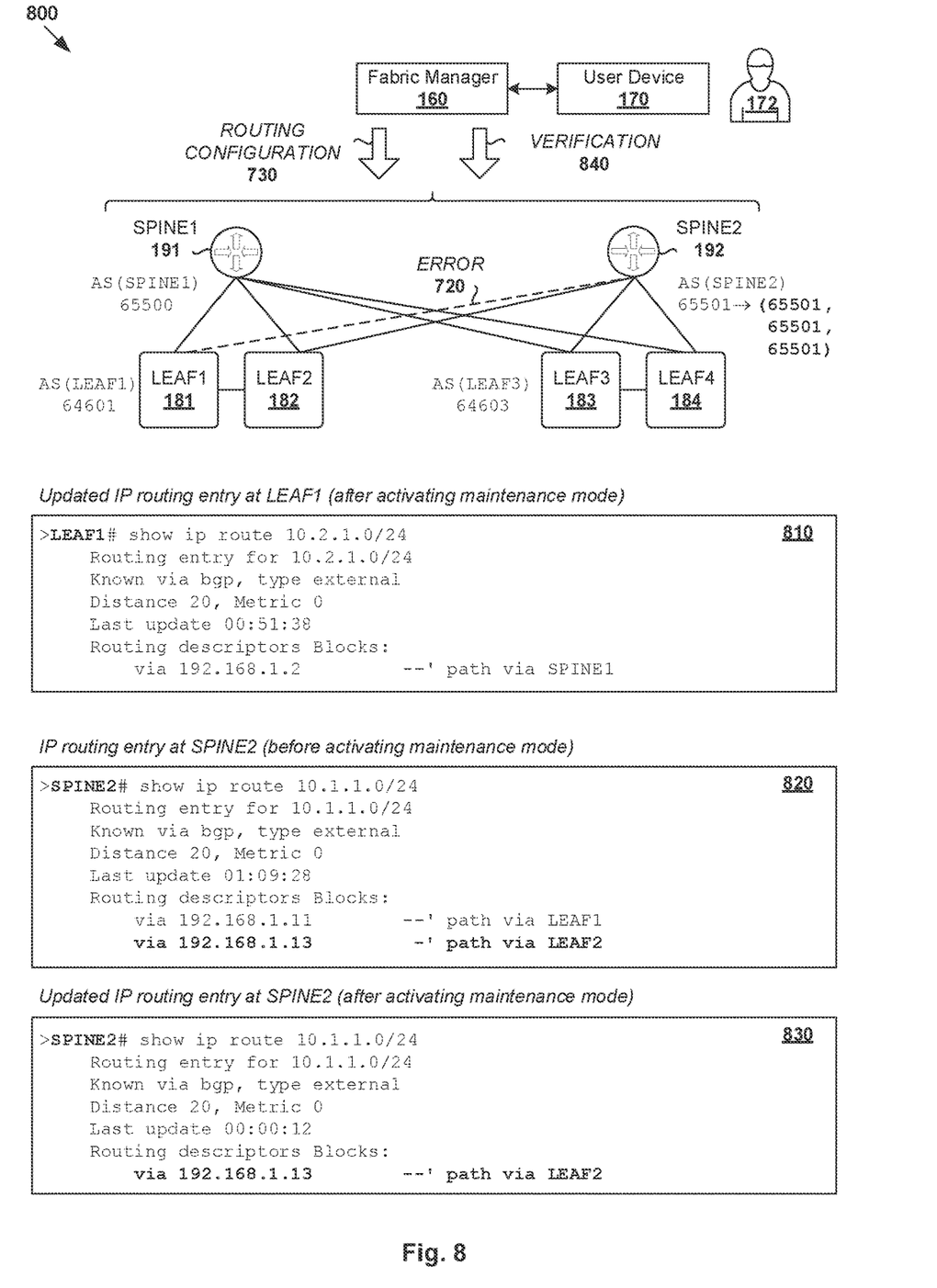
FIG. 8 is a schematic diagram illustrating a second example of routing configuration in response to activating a maintenance mode.

Blocks 410-452 in FIG. 4 will now be explained using FIGS. 7-8. In particular, FIG. 7 is a schematic diagram illustrating first example 700 of routing configuration in response to activating a maintenance mode. FIG. 8 is a schematic diagram illustrating second example 800 of routing configuration in response to activating a maintenance mode. The following examples will be described using LEAF1 181 ("first network element"), SPINE2 192 ("second network element") and a "first link" connecting LEAF1 181 and SPINE2 192.

For outgoing traffic from LEAF1 181 to a destination network in which LEAF3 183 is located, an alternative "second link" may be a link connecting LEAF1 181 and SPINE2 192 ("third network element"). For incoming traffic towards LEAF1 181, an alternative "second link" may be a link connecting SPINE2 192 and LEAF2 182 ("fourth network element"). Note that the "traffic" may include packet(s) that originate from VMs supported by hosts 110.

At 710 in FIG. 7, fabric manager 160 may monitor state information associated with spine switches 191-192 and leaf switches 181-184 to detect any issue affecting the data center fabric. The monitoring process may involve spine switches 191-192 and leaf switches 181-184 reporting state information to fabric manager 160. The state information may be accessible by user 172 operating user device 170 via any suitable user interface provided by fabric manager 160, such as a dashboard of a telemetry service. Any state information may be monitored, some examples of which will be discussed using FIG. 9. See also 410 in FIG. 4.

At 720 in FIG. 7, fabric manager 160 may determine that maintenance for a link connecting LEAF1 181 and SPINE2 192 is required based on the state information. The determination may be based on user 172 detecting an issue affecting the link and initiating maintenance manually using user device 170. Alternatively or additionally, the determination may be based on fabric controller 160 detecting the issue and initiating maintenance automatically. See also 420-421 in FIG. 4. Example issues that are detectable based on the state information may include: physical cabling issue, optics issue, interface error, etc.

In practice, an "interface error" that is detectable based on the state information may include a cyclic redundancy check (CRC) error, input error, etc. Input errors may further include runts, giants, no buffer, frame, overrun, ignored counts, throttles, etc. The error(s) may in turn affect packet transmission over the link connecting LEAF1 181 and SPINE2 192, such as causing packets to be discarded. Maintenance may also be initiated for network diagnosis and troubleshooting purposes.

At 730 in FIG. 7, in response to determination that maintenance is required for the link connecting LEAF1 181 and SPINE2 192, fabric manager 160 may activate a maintenance mode and perform first routing configuration(s) to steer traffic away from the link. From the perspective of LEAF1 181, the traffic to be steered or redirected includes outgoing and incoming traffic. As will be discussed below, the outgoing traffic may be traffic from LEAF1 181 to destination network=10.2.1.0/24 in which LEAF3 183 is located. The incoming traffic may be traffic from LEAF3 183 that is routed via SPINE2 192 and destined for network=10.1.1.0/24 in which LEAF1 181 is located. See 430 and 440-443 in FIG. 4. Depending on the desired implementation, prior to performing the first routing configuration at block 440, fabric manager 160 may verify whether a particular leaf (e.g., LEAF1 181) has an alternate link and/or a BGP status=UP for a particular spine (e.g., SPINE1 191). See 435 in FIG. 4.

At 740 in FIG. 7, one example routing configuration may include modifying an AS attribute assigned to SPINE2 192, such as by replacing "65501" with a longer (i.e., prepended) "65501 65501 65501." This is to achieve AS path prepending, which involves adding AS number(s) to the left side of an AS path. In general, a "route map" may be configured for route distribution towards neighbor=LEAF1 181. A route map may be defined using a map name (e.g., "AS-PRE"), a permission setting (e.g., permit or deny) as to whether to distribute the route map and a sequence number (e.g., 10). A set clause (e.g., "set as-path prepend") may be defined to update the AS attribute assigned to SPINE2 192. This way, fabric manager 160 may increase the AS path length associated with a path via SPINE2 192.

(a) Diverting Outgoing Traffic

At 750 in FIG. 7, in response to activating the maintenance mode and performing first routing configuration 730, a BGP routing entry at LEAF1 181 may be updated as shown. Here, at 760, the length of an AS path list=(65500, 64603) associated with a first path from LEAF1 181 to destination network=10.2.1.0/24 via SPINE1 191 remains the same. In contrast, at 770, for a second path via SPINE2 192, its AS path list has been updated from (65501, 64603) with length=2 to (65501, 65501, 65501, 64603) with increased length=4. Since the first path via SPINE1 191 has a shorter AS path length compared to the second path via SPINE2 192, traffic destined for destination network=10.2.1.0/24 may be steered towards SPINE1 191. This has the effect of selecting an alternative link connecting LEAF1 181 and SPINE1 191 to reach the same destination network.

Further, at 810 in FIG. 8, in response to activating the maintenance mode and performing first routing configuration 730, an IP routing entry at LEAF1 181 may be updated as shown. Here, the IP routing entry specifies one path via SPINE1 191 to reach destination network=10.2.1.0/24 in which LEAF3 183 is located. This way, in response to detecting traffic that is destined for network=10.2.1.0/24, LEAF1 181 may apply the updated IP routing entry to steer the traffic towards SPINE1 191. Compared to 610 in FIG. 6 (i.e., prior to activating the maintenance mode), the path via SPINE2 192 has been removed because maintenance mode has been activated.

(b) Diverting Incoming Traffic

At 820 in FIG. 8, prior to activating the maintenance mode, an IP routing entry at SPINE2 192 may specify two paths to reach network=10.1.1.0/24 in which LEAF1 181 is located. From SPINE2 192, a first path to reach LEAF1 181 is a direct link connecting them (see "via 192.168.1.11" associated with LEAF1 181). A second path to reach LEAF1 181 is an indirect path via LEAF2 182 (see "via 192.168.1.13" associated with LEAF2 182). Using the second path, traffic destined for network=10.1.1.0/24 may be routed via SPINE2 192 and LEAF2 182, which then forwards the traffic via a link connecting LEAF2 182 and LEAF1 181.

At 830 in FIG. 8, in response to activating the maintenance mode and performing first routing configuration 730, the IP routing entry at SPINE2 192 may be updated to steer traffic towards LEAF2 182 instead of LEAF1 181. In particular, the above first path (i.e., direct link with LEAF1 181) may be removed from the IP routing entry. This way, in response to detecting traffic that is destined for network=10.1.1.0/24 in which LEAF1 181 is located, SPINE2 192 may apply the updated IP routing entry to steer the traffic towards LEAF2 182 with next hop IP address=192.168.1.13. This has the effect of selecting an alternative link connecting SPINE2 192 and LEAF3 183 to reach the same destination network.

(c) First Verification

At 840 in FIG. 8 (see top of drawing), fabric manager 160 may perform a first verification or validation to verify that traffic has been steered away from the link connecting LEAF1 181 and SPINE2 192. Any suitable verification step(s) may be performed, such as connectivity checks (e.g., ping, traceroute), monitoring and analyzing state information, etc. For outgoing traffic, fabric manager 160 may perform a connectivity check between LEAF1 181 and destination network=10.2.1.0/24 in which LEAF3 183 is located. This is to verify that connectivity is maintained using an alternative path via SPINE1 191.

Similarly, for incoming traffic, fabric manager 160 may perform a connectivity check between LEAF3 183 and destination network=10.1.1.0/24 in which LEAF1 181 is located. This is to verify that connectivity is maintained using an alternative path via LEAF2 182. State information associated with the link connecting LEAF1 181 and SPINE2 192 may also be monitored. See blocks 450-452 in FIG. 4.

Once verified, any suitable maintenance work on the relevant link. The maintenance may be performed manually by user 172, and/or programmatically using fabric manager 160 or any other management entity. After maintenance is completed, further verification step(s) may be performed to determine whether the relevant issue has been resolved, such as by initiating a connectivity check over that link, etc.

Deactivating Maintenance Mode and Second Routing Configuration

Blocks 460-492 in FIG. 4 will now be explained using FIG. 9, which is a schematic diagram illustrating example routing configuration 900 in response to deactivating a maintenance mode.

Figure 9:
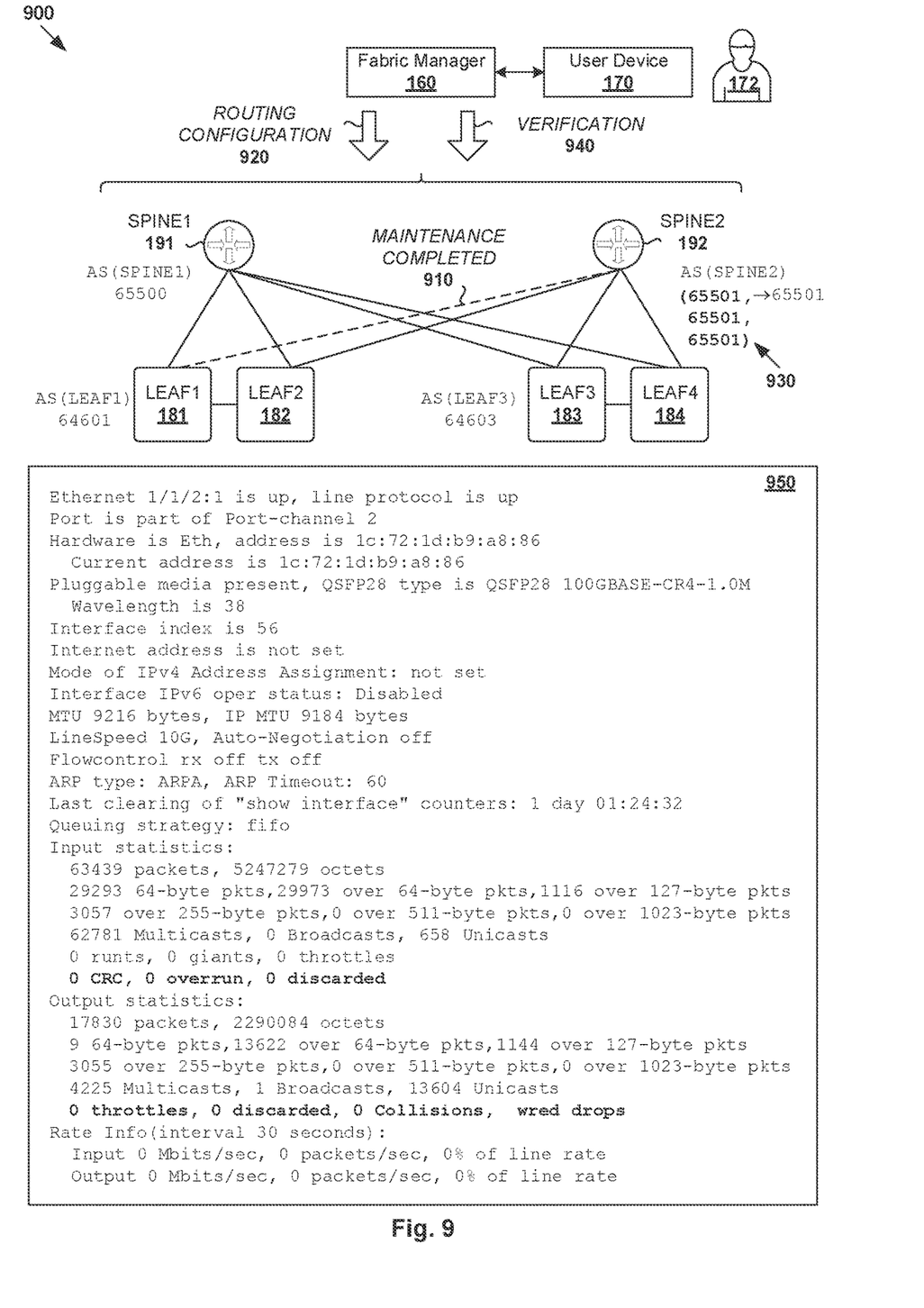
FIG. 9 is a schematic diagram illustrating an example routing configuration in response to deactivating a maintenance mode.

At 910 in FIG. 9, in response to determination that maintenance has been completed (or no longer required), fabric manager 160 may deactivate the maintenance mode for the link connecting LEAF1 181 and SPINE2 192. Depending on the desired implementation, the determination may be based on instruction(s) from user device 170 operated by user 172 after maintenance is completed. Alternatively or additionally, fabric manager 160 may be configured to detect the completion and deactivate the maintenance mode automatically. See blocks 460-462 and 470 in FIG. 4.

(a) Traffic Restoration

At 920 in FIG. 9, in response to a deactivation of the maintenance mode, fabric manager 160 may perform a second routing configuration to restore traffic on the link connecting LEAF1 181 and SPINE2 192. For example, at 930 in FIG. 9, the second routing configuration may include reversing the AS attribute modification in FIGS. 7-8. In particular, AS attribute="65501 65501 65501" assigned to SPINE2 192 may be replaced by "65501." This is to reverse the effect of AS path prepending.

To restore outgoing traffic on the link, LEAF1 181 may be configured to update an IP routing entry to reach destination network=10.2.1.0/24 in which LEAF3 183 is located. As shown at 610-620 in FIG. 6, the IP routing entry may be updated to (once again) include two paths via respective SPINE1 191 and SPINE2 192. Based on the updated AS attribute, a BGP routing entry to reach 10.2.1.0/24 from LEAF1 181 may be updated to include two AS paths. As shown at 630-640 in FIG. 6, a first AS path that includes (SPINE1 191, LEAF3 183) specifies list=(65500, 64603) with AS path length=2. As shown at 650 in FIG. 6, A second AS path that includes (SPINE2 192, LEAF3 183) specifies list=(65501, 64603) with equal AS path length=2. Detailed description of the routing entries is not repeated here for brevity.

To restore incoming traffic on the link, SPINE2 192 may be configured to update an IP routing entry to reach destination network=10.1.1.0/24 in which LEAF1 181 is located. As shown at 810 in FIG. 8, the IP routing entry may be updated to (once again) include two paths via respective LEAF1 181 and LEAF2 182. Detailed description of the routing entry is not repeated here for brevity.

(b) Second Verification

At 940 in FIG. 9, fabric manager 160 may perform a second verification to verify that traffic has been restored on the link connecting LEAF1 181 and SPINE2 192. Any suitable verification step(s) may be performed, such as connectivity checks (e.g., ping, traceroute), monitoring and analyzing state information, etc. For outgoing traffic, fabric manager 160 may perform a connectivity check between LEAF1 181 and destination network=10.2.1.0/24 in which LEAF3 183 is located. Similarly, for incoming traffic, fabric manager 160 may perform a connectivity check between LEAF3 183 and destination network=10.1.1.0/24 in which LEAF1 181 is located. The connectivity checks are performed to verify that traffic is routable via the link between LEAF1 181 and SPINE2 192. See blocks 490-492 in FIG. 4.

At 950 in FIG. 9, the second verification may include monitoring and analyzing state information associated with the link connecting LEAF1 181 and SPINE2 192. For example in FIG. 9, the "state information" may include the number of packets transmitted (e.g., multicast, unicast, broadcast packets), size of packets, number of CRC errors, number of overrun errors, number of packets discarded, number of runts, number of giants, number of throttles, collision errors, line rate, maximum transmission unit (MTU) settings, address resolution protocol (ARP) settings, interface information, any combination thereof, etc. Similar state information may be monitored at block 405 in FIG. 4.

Container Implementation

Although explained using VMs 131-136, it should be understood that physical network environment 100 may include other virtual workloads, such as containers, etc. As used herein, the term "container" (also known as "container instance") is used generally to describe an application that is encapsulated with all its dependencies (e.g., binaries, libraries, etc.). For example, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 9. For example, the instructions or program code, when executed by the processor of the computer system, may cause the processor to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a management entity to perform routing configuration for data center fabric maintenance, wherein the method comprises:
   monitoring state information associated with multiple links and multiple network elements forming a data center fabric, wherein the multiple links include a first link connecting a first network element and a second network element from the multiple network elements;
   in response to determination that maintenance is required for the first link based on the state information,
   activating a maintenance mode for the first link; and
   performing a first routing configuration to influence the first network element and the second network element to steer traffic away from the first link to at least one second link while the maintenance mode is activated, wherein performing the first routing configuration includes configuring the first network element and the second network element; and
   in response to a deactivation of the maintenance mode for the first link, performing a second routing configuration to influence the first network element and the second network element to restore traffic on the first link.

2. The method of claim 1, wherein performing the first routing configuration comprises:
   updating attribute information associated with the second network element to influence the first network element to select a particular second link over the first link.

3. The method of claim 2, wherein performing the first routing configuration comprises:
   updating the attribute information in the form of an autonomous system (AS) attribute associated with the second network element, wherein the AS attribute is updated to increase a length of a first AS path list associated with the first link.

4. The method of claim 3, wherein performing the first routing configuration comprises:
   configuring the first network element to update a routing table entry to influence selection of a particular second link over the first link, wherein (a) the particular second link connects the first network element with a third network element and (b) the updated routing table entry specifies the first AS path list that is longer than a second AS path list associated with the particular second link.

5. The method of claim 1, wherein performing the first routing configuration comprises:
   configuring the second network element to update a routing table entry to influence selection of a particular second link over the first link to reach a destination network, wherein the particular second link connects the second network element with a fourth network element.

6. The method of claim 1, wherein the determination that maintenance is required comprises:
   detecting an issue affecting the first link based on the state information, wherein the issue is associated with one or more of the following: physical cabling issue, optics issue and interface error.

7. The method of claim 1, wherein the method further comprises one or more of the following:
   performing a first verification to determine whether traffic has been steered away from the first link after the first routing configuration; and
   performing a second verification to determine whether traffic has been restored on the first link after the second routing configuration including configuring the first network element and the second network element.

8. A non-transitory computer-readable storage medium that includes a set of instructions which, in response to execution by a processor of a computer system, cause the processor to perform a method of routing configuration for data center fabric maintenance, wherein the method comprises:
   monitoring state information associated with multiple links and multiple network elements forming a data center fabric, wherein the multiple links include a first link connecting a first network element and a second network element from the multiple network elements;
   in response to determination that maintenance is required for the first link based on the state information,
   activating a maintenance mode for the first link; and
   performing a first routing configuration to influence the first network element and the second network element to steer traffic away from the first link to at least one second link while the maintenance mode is activated, wherein performing the first routing configuration includes configuring the first network element and the second network element; and
   in response to a deactivation of the maintenance mode for the first link, performing a second routing configuration to influence the first network element and the second network element to restore traffic on the first link.

9. The non-transitory computer-readable storage medium of claim 8, wherein performing the first routing configuration comprises:
   updating attribute information associated with the second network element to influence the first network element to select a particular second link over the first link.

10. The non-transitory computer-readable storage medium of claim 9, wherein performing the first routing configuration comprises:
    updating the attribute information in the form of an autonomous system (AS) attribute associated with the second network element, wherein the AS attribute is updated to increase a length of a first AS path list associated with the first link.

11. The non-transitory computer-readable storage medium of claim 10, wherein performing the first routing configuration comprises:
configuring the first network element to update a routing table entry to influence selection of a particular second link over the first link, wherein (a) the particular second link connects the first network element with a third network element and (b) the updated routing table entry specifies the first AS path list that is longer than a second AS path list associated with the particular second link.

12. The non-transitory computer-readable storage medium of claim 8, wherein performing the first routing configuration comprises:
configuring the second network element to update a routing table entry to influence selection of a particular second link over the first link to reach a destination network, wherein the particular second link connects the second network element with a fourth network element.

13. The non-transitory computer-readable storage medium of claim 8, wherein the determination that maintenance is required comprises:
detecting an issue affecting the first link based on the state information, wherein the issue is associated with one or more of the following: physical cabling issue, optics issue and interface error.

14. The non-transitory computer-readable storage medium of claim 8, wherein the method further comprises one or more of the following:
performing a first verification to determine whether traffic has been steered away from the first link after the first routing configuration; and
performing a second verification to determine whether traffic has been restored on the first link after the second routing configuration including configuring the first network element and the second network element.

15. A computer system, comprising:
a processor; and
a non-transitory computer-readable medium having stored thereon instructions that, in response to execution by the processor, cause the processor to:
monitor state information associated with multiple links and multiple network elements forming a data center fabric, wherein the multiple links include a first link connecting a first network element and a second network element from the multiple network elements; and
in response to determination that maintenance is required for the first link based on the state information, activate a maintenance mode for the first link, and perform a first routing configuration including configuring the first network element and the second network element to influence the first network element and the second network element to steer traffic away from the first link to at least one second link while the maintenance mode is activated; and
in response to a deactivation of the maintenance mode for the first link, perform a second routing configuration to influence the first network element and the second network element to restore traffic on the first link.

16. The computer system of claim 15, wherein the instructions, in response to execution by the processor, cause the processor to update attribute information associated with the second network element to influence the first network element to select a particular second link over the first link.

17. The computer system of claim 16, wherein the instructions, in response to execution by the processor, cause the processor to update the attribute information in the form of an autonomous system (AS) attribute associated with the second network element, wherein the AS attribute is updated to increase a length of a first AS path list associated with the first link.

18. The computer system of claim 17, wherein the instructions, in response to execution by the processor, cause the processor to configure the first network element to update a routing table entry to influence selection of a particular second link over the first link, wherein (a) the particular second link connects the first network element with a third network element and (b) the updated routing table entry specifies the first AS path list that is longer than a second AS path list associated with the particular second link.

19. The computer system of claim 15, wherein the instructions, in response to execution by the processor, cause the processor to configure the second network element to update a routing table entry to influence selection of a particular second link over the first link to reach a destination network, wherein the particular second link connects the second network element with a fourth network element.

20. The computer system of claim 15, wherein the instructions, in response to execution by the processor, cause the processor to detect an issue affecting the first link based on the state information, wherein the issue is associated with one or more of the following: physical cabling issue, optics issue and interface error.

21. The computer system of claim 15, wherein the non-transitory computer-readable medium having stored thereon additional instructions that, in response to execution by the processor, cause the processor to perform one or more of the following:
a first verification to determine whether traffic has been steered away from the first link after the first routing configuration; and
a second verification to determine whether traffic has been restored on the first link after the second routing configuration including configuring the first network element and the second network element.

* * * * *